Dec. 31, 1929.　　　　J. H. SAGER　　　　1,741,339
PITCHER
Filed April 13, 1926
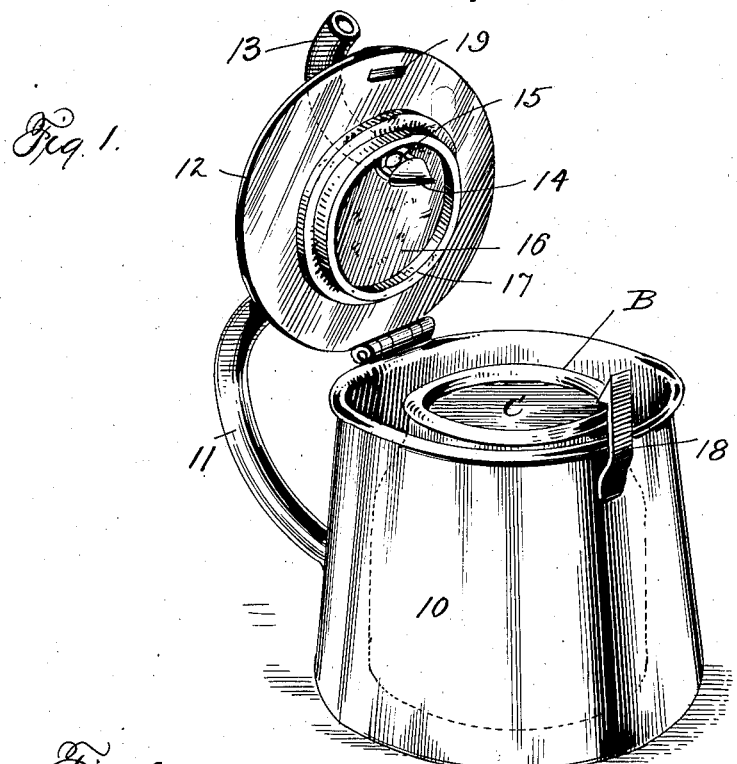
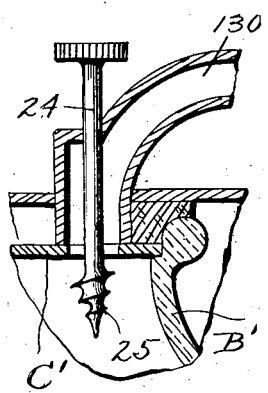
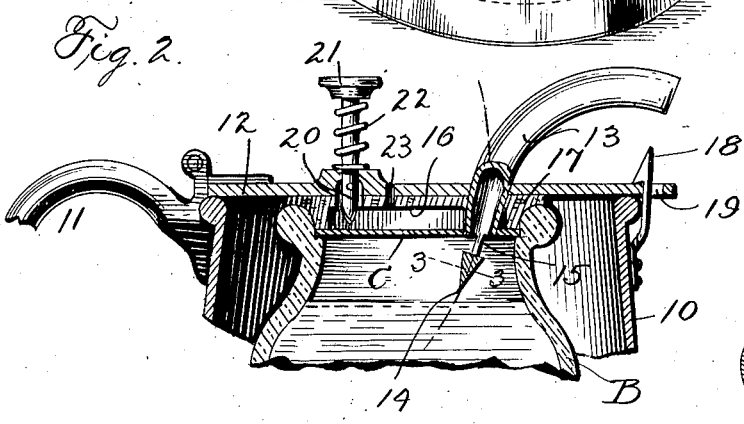
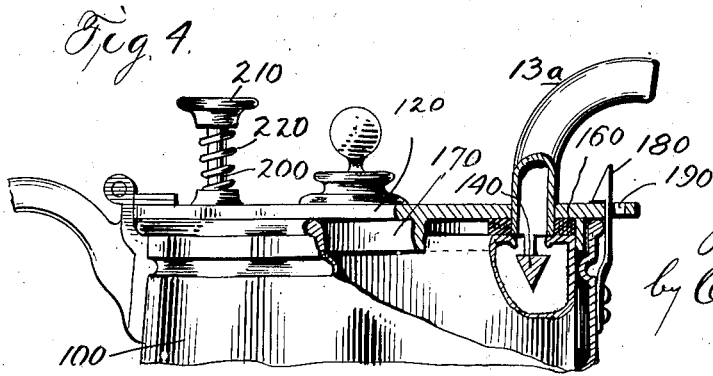
Inventor
Jesse H. Sager,
by Chas. Williamson
Attorney Patented Dec. 31, 1929

1,741,339

UNITED STATES PATENT OFFICE

JESSE H. SAGER, OF SMITHTON, PENNSYLVANIA

PITCHER

Application filed April 13, 1926. Serial No. 101,775.

Containers of liquid food in which they are sold are usually so unattractive looking as to be objectionable for placing upon the dining table, and besides the tops or caps must be perforated for pouring out their contents, and the perforation is not conveniently done, and it is not easy to pour out the contents through such a perforation, and an unsightly appearance is almost certain to exist. I have in mind particularly cans in which condensed milk is sold, and the glass jars or bottles in which cream and fresh milk are sold, and in embodying my invention I have had these instances particularly in mind, but, of course, do not limit myself to the use of my invention as hereinafter set forth to these particular cases of liquid food or beverages. My invention consists in whatever is described by or is included within the terms or scope of the appended claims.

In the drawings:

Fig. 1 is a perspective view of a pitcher or jug embodying my invention, suited for use with a glass bottle containing cream or milk, the lid or cover being shown open;

Fig. 2 is a vertical section thereof, the cover being shown closed;

Fig. 3 is a detail view in horizontal section on the line 3—3 of Fig. 2;

Fig. 4 is a view similar to Fig. 3 of an embodiment of my invention, suitable for condensed milk containers;

Fig. 5 is a detail view in section illustrating another embodiment of my invention, suitable for containers of milk or cream, where the caps or covers are made of cardboard.

My invention is embodied in a jug or pitcher, 10, having a handle, 11, and a hinged cover, 12, preferably hinged at the point where the handle joins the cover, and having diametrically opposite, an upward and outwardly curved pouring spout, 13, which opens through the underside of the cover close to the rim of the paper cap or cover, C, of the glass cream or milk bottle, B, when placed in the pitcher, so that a perforating projection, 14, on the underside of the cover will engage the cap or cover as near to its edge support as possible to assure that the perforating projection, 14, will pass through the cap without bending it downward or distorting it, and thus assure a perforation in the cap which will not result in leakage around the projection, 14. The perforating projection, 14, is made tapering so that it will not only readily perforate the cover or cap, but there will be a tight fit of the walls of the hole upon the projection to promote a non-leaking joint between them. The projection or perforation is preferably made substantially elliptical in cross section with the long axis of the ellipse parallel with the circumference of the cap or cover, C, so as to avoid deformation of the cap or cover, in perforating the same, which is apt to result with a perforating projection that is round in cross section. The perforating projection, 14, may be an extension of the end of the pouring nozzle or spout, and it is provided next the inner end of the spout with a transverse slot or hole, 15, which when the cover is closed extends or is situated beneath the cap or cover, C, and thus, provides a free passage into the nozzle of the contents of the jar or bottle. For the double purpose of sealing the mouth of the jar or bottle above the cap, or closure, and to aid in holding the latter against lateral displacement, a gasket, 16, of some yieldable material, which may be cork, is secured to the underside of the lid, 12, in position to engage the rim of the bottle or jar, and preferably the underside of the lid has a downwardly projecting rim or annular flange, 17, which will enter the mouth of the bottle or jar, B, and reach to the top of the cap or cover, C. This will serve the twofold purpose of preventing lateral displacement of the bottle or jar when in the pitcher, and will seat the cap or cover C, even should the perforator 14, have any tendency to displace it. In the case of the embodiment of my invention for cans or containers of condensed milk, there is need only for a rim, 170, that will encompass or encircle the outside of the condensed milk container at the top. Of course, instead of a rim there could be simply several spaced projections. And in this case, as shown in Fig. 4 a gasket, 160, say of cork, may be applied around the inner end of the pouring nozzle, which will press against the top of the condensed milk can around the perforations which makes a leak proof joint.

It is, of course, desirable that the lid, 12, when closed shall be firmly held in a closed position to maintain leak-tight contact with the can or bottle tops or closures. For this purpose I provide a spring latch, 18, secured to the pitcher so as to project above the rim thereof, situated to pass through a slot or notch, 19, at the edge of the lid immediately below the pouring nozzle or spout. The upper edge of the spring latch is beveled so that it is more or less sharp and the described location with reference to the spout makes the latter a guard, and also prevents the application of more than enough force to free the latch, and thus avoids the danger of injuring the latch so that it would fail to hold the lid in that tight condition which is a requisite to a practical article to serve the purpose of my invention.

Of course, air must be permitted to enter the container to cause the outflow of its liquid contents. For that purpose I provide a plunger, 20, that passes through a vertical hole in the pitcher lid, the lower end of which is sharpened or pointed, and the upper end of which has a head, 21, so that when downward pressure is applied to the head by the thumb of the hand holding the pitcher handle, the plunger will be forced downward and a perforation made in the bottle or can top or closure. A coil spring, 22, interposed between the top of the lid and the underside of the plunger head automatically lifts the plunger head to remove the pointed end from the hole it makes, so that there may be no obstruction to the free flow of air into the bottle or can. Preferably a small hole or perforation, 23, is made through the pitcher lid for the flow of air.

As shown in Fig. 5, the perforation for establishing communication between the interior of the bottle or jar, and the pouring nozzle, may be a screw-form device comprising a shank, 24, which passes vertically through the pouring nozzle with a head on the outside of the latter, and having an auger bit form of point, 25, which will screw through the bottle cap or cover, and exert a lifting action upon the cap or cover on the underside to press it against the adjacent surface of the pitcher lid to make a liquid-tight joint.

Preferably in the case of the paper cap perforating projection, 14, the latter has a curvature concentric with the hinge of the lid, so as to promote the formation of a clean and not distorted hole in the paper cap, which a straight form of projection might produce. With the case of a metal cover, such as a condensed milk container has, the straight form of perforating projection, 14, is preferable to avoid any tendency of the container when empty being moved radially outward so as to jam in the pitcher.

There is the likelihood, especially with thick liquid like condensed milk, of the pouring nozzle being clogged. It will, therefore, be desirable in pitchers for this use to provide a brush that may be thrust into the nozzle to remove any obstruction therein.

It will be seen that by my invention I provide a highly useful article of tableware which will most easily and satisfactorily provide the necessary perforation in liquid containers, which will afford a most convenient way of pouring the contents of such containers, and which may be given an external appearance that will provide an attractive article for dining table use.

What I claim is:

1. A pitcher-like article having a movable lid provided with a pouring nozzle, a perforator on the underside of the lid situated to perforate a closure of a liquid container near the rim thereof, said perforator extending from the entrance end of the nozzle and spaced therefrom to allow free passage of fluid into the nozzle, and a container engaging part carried by said lid to confine the container against misplacement and movable into contact with the mouth of the container and making a tight joint therewith.

2. A pitcher-like article having a bottom and side walls and a hinged lid, the lid having a pouring nozzle, a perforator on the under side of the lid situated to perforate a closure of a liquid container near the rim thereof, said perforator extending from the entrance end of the nozzle and spaced therefrom to allow free passage of fluid into the nozzle, said container being placed in said pitcher-like article loose or free therein, and a container engaging part carried by the lid to confine the container against displacement and being of ring-form so as to enter and contact with the mouth of the container and make a tight joint therewith.

In testimony whereof I hereunto affix my signature.

JESSE H. SAGER.